March 21, 1933. H. H. MINER 1,902,176
MANDREL FOR HOLLOW CRANK SHAFTS
Filed June 13, 1931
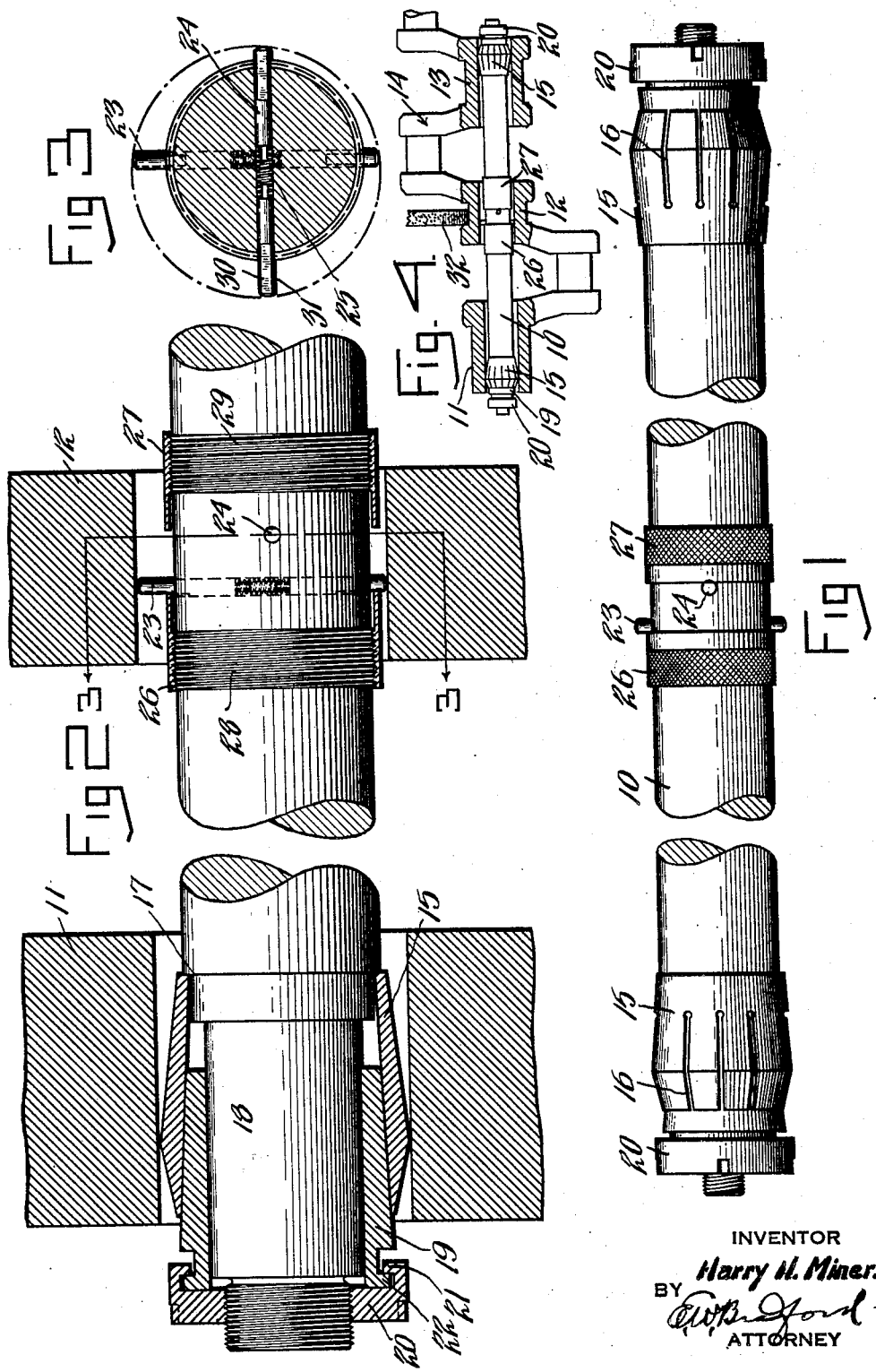
INVENTOR
*Harry H. Miner.*
BY
ATTORNEY Patented Mar. 21, 1933

1,902,176

UNITED STATES PATENT OFFICE

HARRY H. MINER, OF PARIS, FRANCE, ASSIGNOR TO LANDIS TOOL COMPANY, OF WAYNESBORO, PENNSYLVANIA, A CORPORATION OF PENNSYLVANIA

MANDREL FOR HOLLOW CRANK SHAFTS

Application filed June 13, 1931. Serial No. 544,186.

Certain types of crank shafts as for example those used in airplane engines have hollow bearings. It is difficult to grind these bearings without to some extent crushing or distorting the bearing. In order to prevent this it is necessary to support the interior of the bearing against the grinding wheel. This invention relates to means for supporting these bearings to prevent their being pressed out of shape.

The object of the invention therefore is to provide means for supporting hollow crank shafts during the grinding of the bearings.

A further object is to provide a mandrel for supporting the bearings of hollow crank shafts during grinding of the bearings.

Referring to the accompanying drawing, which is made a part hereof and on which similar reference characters indicate similar parts, Figure 1 is a perspective view of the mandrel, Figure 2, a section showing the mandrel mounted within the bearings, Figure 3, a section on line 3—3 of Figure 2, and Figure 4, a sectional view showing the mandrel in position in a crank shaft, the showing being somewhat diagrammatic.

In the drawing numeral 10 indicates a mandrel which is adapted to be inserted within the hollow bearings 11, 12 and 13 of a crank shaft 14. In the diagrammatic showing of Figure 4, 12 indicates the bearing which is being ground and which therefore must have means within it supporting the interior walls against the periphery of a grinding wheel. The ends of the mandrel 10 are provided with expansible bushings consisting of sleeves 15 which are provided with radial slots 16 extending through the greater portion of the sleeve. The sleeve 15 is tapered and the inner end abuts against a shoulder 17 formed on the mandrel. The end of the mandrel is further cut away to provide a portion 18 over which fits a tapered sleeve 19, this sleeve being inserted within the inner wall of the sleeve 15. A nut 20 is screw threaded on the end of the mandrel and has a flange 21 engaging an outwardly projecting flange 22 on the sleeve 19. The purpose of the arrangement just described is to provide means for expanding the sleeve 15 to cause it to engage tightly within the interior of the bearing 11. The opposite end of the mandrel has a similar structure for engaging within the bearing 13. Means engaging the inner walls of the bearing 12 are shown in Figures 2 and 3 and consist of pairs of plungers 23 and 24. Springs 25 are positioned against the inner ends of these plungers to hold them outwardly against the interior of the bearing 12. Sleeves 26 and 27 are screw threaded on their interior at one end to engage threads 28 and 29 on the mandrel 10, the inner ends of these sleeves engage against plungers 23 and 24. The plungers 23 and 24 have one side flattened as shown at 30 to provide shoulders 31 which seat against the inner ends of the sleeves 26 and 27 to prevent the pins from being moved radially outwardly too far by the springs 25.

In operation the mandrel is inserted within the hollow bearings of a crank shaft as shown in Figure 4, with the plungers 23 and 24 in contact with the interior of the bearing. The sleeves are then turned until their ends engage the plungers so as to provide friction sufficient to hold the plungers against the interior of the bearing.

The pins prevent the grinding wheel 32 from distorting the shape of the bearing and thus insure more perfect work.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. A mandrel for grinding hollow crank shafts comprising a bar having means for securing it in two of the bearings of the crank shaft and having resilient expansible means engageable in another bearing to support it while it is being ground, substantially as set forth.

2. A mandrel for grinding hollow crank shafts comprising a bar having expansible sleeves movable to engage the interior of each of a pair of bearings and having other means resiliently movable radially and engageable with the interior of a bearing to be ground to support it, substantially as set forth.

3. A mandrel for grinding crank shafts comprising a shaft having means for holding its ends in position in the interior of each of two bearings of a crank shaft and having radial plungers resiliently movable to engage the interior of a bearing to be ground, substantially as set forth.

4. A mandrel for supporting hollow crank shafts while machining or grinding them comprising a bar having expansible sleeves on each end for engaging in hollow bearings of the crank shaft and having a pair of oppositely movable radial plungers intermediate its ends for engaging against the interior of the bearing to be ground to support the bearing against the periphery of a grinding wheel, substantially as set forth.

5. A mandrel for grinding hollow crank shafts comprising a bar having expansible sleeves on each end for engaging in hollow bearings of a crank shaft and having a pair of radially movable plungers intermediate its ends for engaging against the interior of the bearing to be ground to support the bearing against the periphery of a grinding wheel, and means for holding said plungers against the inner surface of the bearing, substantially as set forth.

6. A mandrel for grinding hollow crank shafts comprising a bar having expansible sleeves on each end for engaging in hollow bearings of a crank shaft and having a pair of radially movable plungers intermediate its ends for engaging against the interior of the bearing to be ground to support the bearing against the periphery of a grinding wheel, and means for holding said plungers against the interior of said bearing, said means comprising a pair of sleeves screw-threaded upon the bar and frictionally engaging the said plungers to prevent their being moved radially inwardly, substantially as set forth.

7. A mandrel for supporting hollow bearings of a crank shaft against a grinding wheel said mandrel having sleeves engageable with the interior of two of said bearings to support the shaft and having a plurality of radial chambers, plungers mounted in these chambers, resilient means being positioned in the chambers against the plungers to hold the outer ends of the plungers in engagement with the interior of the hollow bearing to support said bearing against the periphery of the grinding wheel, substantially as set forth.

8. A mandrel for supporting a crank shaft having hollow bearings comprising a bar having removable expansible sleeves engaging two of said bearings to support the shaft and having a plurality of radial bores extending through it, a pair of plungers in each of said bores and a single spring in each of said bores, said spring having its ends positioned against the inner ends of said plungers to urge the plungers radially outwardly to maintain the outer ends in engagement with the interior of a hollow bearing on the crank shaft, substantially as set forth.

9. A mandrel for supporting a crank shaft during machining or grinding of bearings thereon comprising a bar adapted to be positioned through the bores of hollow bearings, the ends of said bar having expansible sleeves movable to engage the interior of the bearings and having a plurality of equally spaced radial bores, each of said bores having a pair of plungers radially movable therein, the said bores each having a single spring positioned between the inner ends of the plungers to urge the plungers radially outwardly whereby the outer ends of all the plungers will engage the interior of the bearings with substantially the same pressure irrespective of any eccentricity of the bar with the interior of the bearing, substantially as set forth.

In witness whereof, I have hereunto set my hand at Waynesboro, Pennsylvania, this 29th day of May, A. D. nineteen hundred and thirty-one.

HARRY H. MINER.